(12) United States Patent
Savaglio et al.

(10) Patent No.: US 6,501,831 B2
(45) Date of Patent: *Dec. 31, 2002

(54) METHOD OF PROVIDING 911 SERVICE TO A PRIVATE BRANCH EXCHANGE

(75) Inventors: John Joseph Savaglio, Oak Lawn, IL (US); Richard Bruce Fowler, Naperville, IL (US)

(73) Assignee: Ameritech Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/093,749

(22) Filed: Mar. 8, 2002

(65) Prior Publication Data

US 2002/0090061 A1 Jul. 11, 2002

Related U.S. Application Data

(63) Continuation of application No. 09/642,430, filed on Aug. 21, 2000.

(51) Int. Cl.[7] .............................................. H04M 11/04
(52) U.S. Cl. ......................................... 379/45; 379/37
(58) Field of Search ..................................... 379/37–51

(56) References Cited

U.S. PATENT DOCUMENTS

| | | | | |
|---|---|---|---|---|
| 5,235,630 A | * | 8/1993 | Moody et al. | 379/37 |
| 5,347,567 A | * | 9/1994 | Moody et al. | 379/45 |
| 6,243,442 B1 | * | 6/2001 | Tanaka et al. | 379/45 |
| 6,266,397 B1 | * | 7/2001 | Stoner | 379/45 |

* cited by examiner

Primary Examiner—Wing Fu Chan
(74) Attorney, Agent, or Firm—Dale B. Halling

(57) ABSTRACT

A method of providing 911 service to a private branch exchange, includes grouping a plurality of private telephone numbers into a set. An outgoing telephone line for a 911 call is assigned to the set. A location information for the outgoing telephone line is input into a location database.

9 Claims, 4 Drawing Sheets

METHOD OF PROVIDING 911 SERVICE TO A PRIVATE BRANCH EXCHANGE

This patent is a continuation of copending U.S. application Ser. No. 09/642,430, filed on Aug. 21, 2000, which application is hereby incorporated by reference.

FIELD OF THE INVENTION

The present invention relates to generally to the field of 911 emergency service systems and more particularly to a method of providing 911 service to a private branch exchange.

BACKGROUND OF THE INVENTION

A Public Safety Answering Point (PSAP) uses an automatic location identification (ALI) information provided with the automatic number identification (ANI) to determine the location of a 911 telephone call. Unfortunately, when a 911 call is placed from a business having a PBX (Private Branch Exchange), the PSAP only receives the billing address of the business. For large businesses having multiple locations, this does not provide any useful information. Some PBX providers allow the owners to enter in correct location information for all their lines. Unfortunately, this is time consuming and therefor rarely is done.

Thus there exists a need for a method of providing 911 service to a private telephone numbering system that is easy to setup.

DETAILED DESCRIPTION OF THE DRAWINGS

A method of providing 911 service to a private branch exchange, includes grouping a plurality of private telephone numbers into a set. An outgoing telephone line for a 911 call is assigned to the set. A location information for the outgoing telephone line is input into a location database (E911 database). By grouping the telephone lines significantly less information has to be input into the location database. The groups are selected to be telephone lines in a set geographic area. For instance all the telephones on the third floor of a small building might be grouped together. This provides emergency personnel with plenty of information to locate the emergency.

Figure 1:
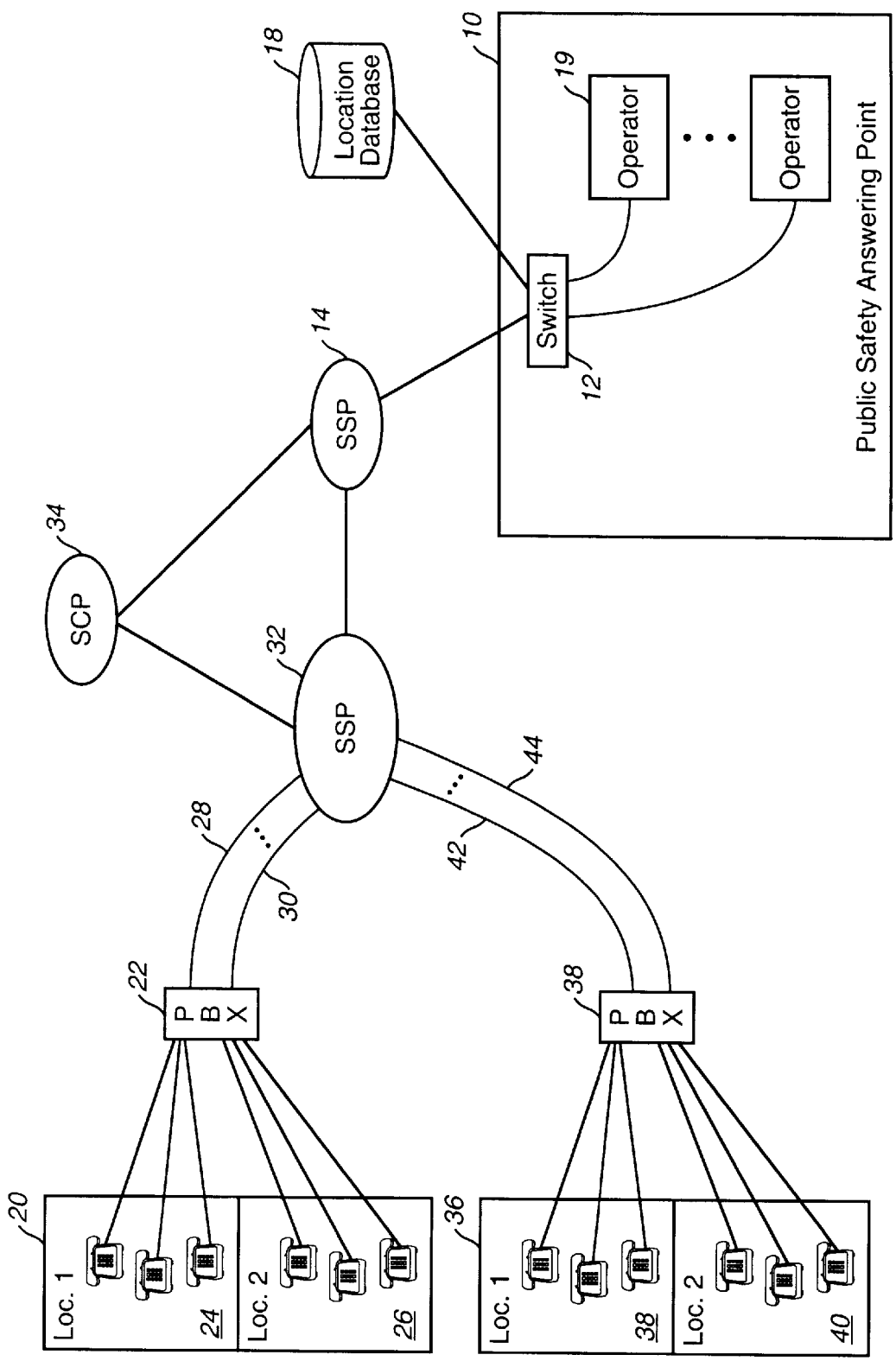
FIG. 1 is a block diagram of public safety answering service for a private telephone numbering system in accordance with one embodiment of the invention.

FIG. 1 is a block diagram of public safety answering service for a private branch exchange in accordance with one embodiment of the invention. A public safety answering point (PSAP) 10 includes a switch 12 connected to a SSP (Service Switching Point) 14. The switch 12 triggers on incoming call and forms a location query. The location query is set to a location database (E911 database) 16. The call and location information are forwarded to one of a plurality of operators 18.

A company 20 using a PBX 22 groups private telephone lines according to their location. This company 20 has two locations 24, 26. Any 911 call from the first location 24 is routed over a predetermined public telephone line 28. Any 911 call from the second location 26 is routed over a predetermined public telephone line 30. The PBX is connected to a SSP 32. A 911 call is then sent to SSP 14 and to the PSAP 10. A SCP (Service Control Point) 34 is connected through an intelligent network to the SSPs 14, 32. The SCP 34 may provide routing information to the SSP 32 for 911 calls. A second company 36 also has a PBX 38. The company 36 also divides its telephones into two locations 38, 40. Note that any number of locations could be handled and the invention encompasses more than a single PBX. A 911 call from any of the telephones in the first location 38 are routed over a predetermined external telephone line 42. A 911 call from any of the telephones in the second location 40 are routed over a predetermined external telephone line 44.

Figure 2:
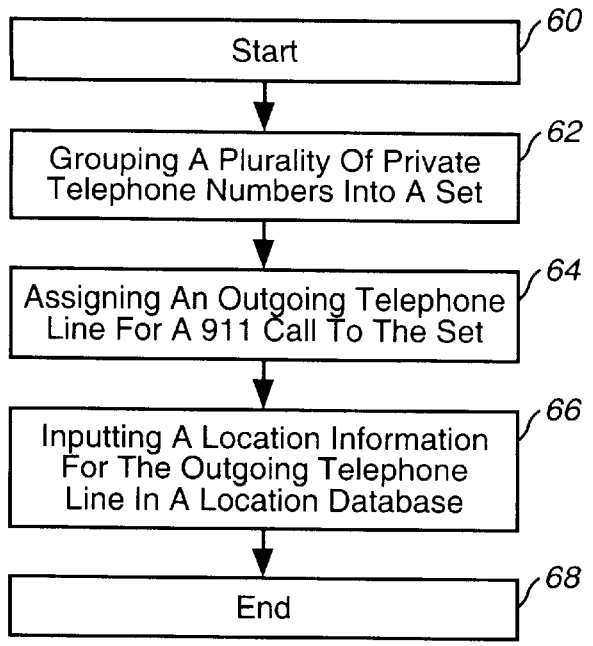
FIG. 2 is a flow chart of the steps used in a method of providing 911 service to a private branch exchange in accordance with one embodiment of the invention.

FIG. 2 is a flow chart of the steps used in a method of providing 911 service to a private branch exchange in accordance with one embodiment of the invention. The process start, step 60, by grouping a plurality of telephone numbers into a set at step 62. An outgoing telephone line for a 911 call is assigned to the set at step 64. At step 66, a location information for the outgoing telephone line is input into a location database of a telephone company which ends the process at step 68. In one embodiment, the plurality of private telephone numbers are selected by an origination location. In one embodiment a private branch exchange is programmed to selected the outgoing telephone line when a 911 call is received from one of the plurality of private telephone numbers.

In one embodiment when the 911 call is dialed from one of the plurality of private telephone numbers, the 911 call is sent out over the outgoing telephone line. The 911 call is triggered on at a service switching point. A routing query is transmitted to a switching control point (SCP). A routing instruction is received from the SCP. The 911 call is routed to a proper PSAP. A location database is queried for a location associated with a telephone number of the outgoing telephone line.

Figure 3:
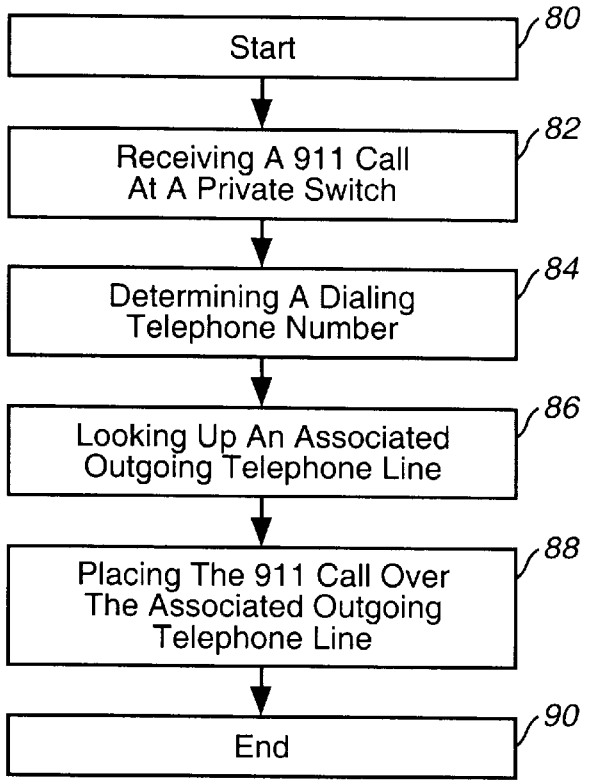
FIG. 3 is a flow chart of the steps used in a method of providing 911 service to a private branch exchange in accordance with one embodiment of the invention.

FIG. 3 is a flow chart of the steps used in a method of providing 911 service to a private branch exchange in accordance with one embodiment of the invention. The process starts, step 80, by receiving a 911 call at a private switch at step 82. In one embodiment, the private switch is a private branch exchange. A dialing telephone number is determined at step 84. An associated outgoing telephone line is looked up at step 86. At step 88, the 911 call is placed over the associated outgoing telephone line which ends the process at step 90. The 911 call is received at a service switching point (SSP). The 911 call is triggered on and the SSP sends a query to a switching control point (SCP). A response is received that includes a routing instruction. In one embodiment the response includes the number of the associated outgoing telephone line. The 911 call is routed to a public safety answering point (PSAP). A location query is sent to a location database. The 911 call is forwarded to an operator. A location information is transmitted to the operator.

In one embodiment, a first plurality of private telephone numbers are grouped into a first set. A second plurality of private telephone numbers are grouped into a second set. One of a plurality of outgoing telephone lines is assigned to the first set. A second of the plurality of outgoing telephone lines is assigned to the second set. The location database is programmed to include a location for the one of the plurality of outgoing telephone lines and a second location for the second of the plurality of outgoing telephone lines.

Figure 4:
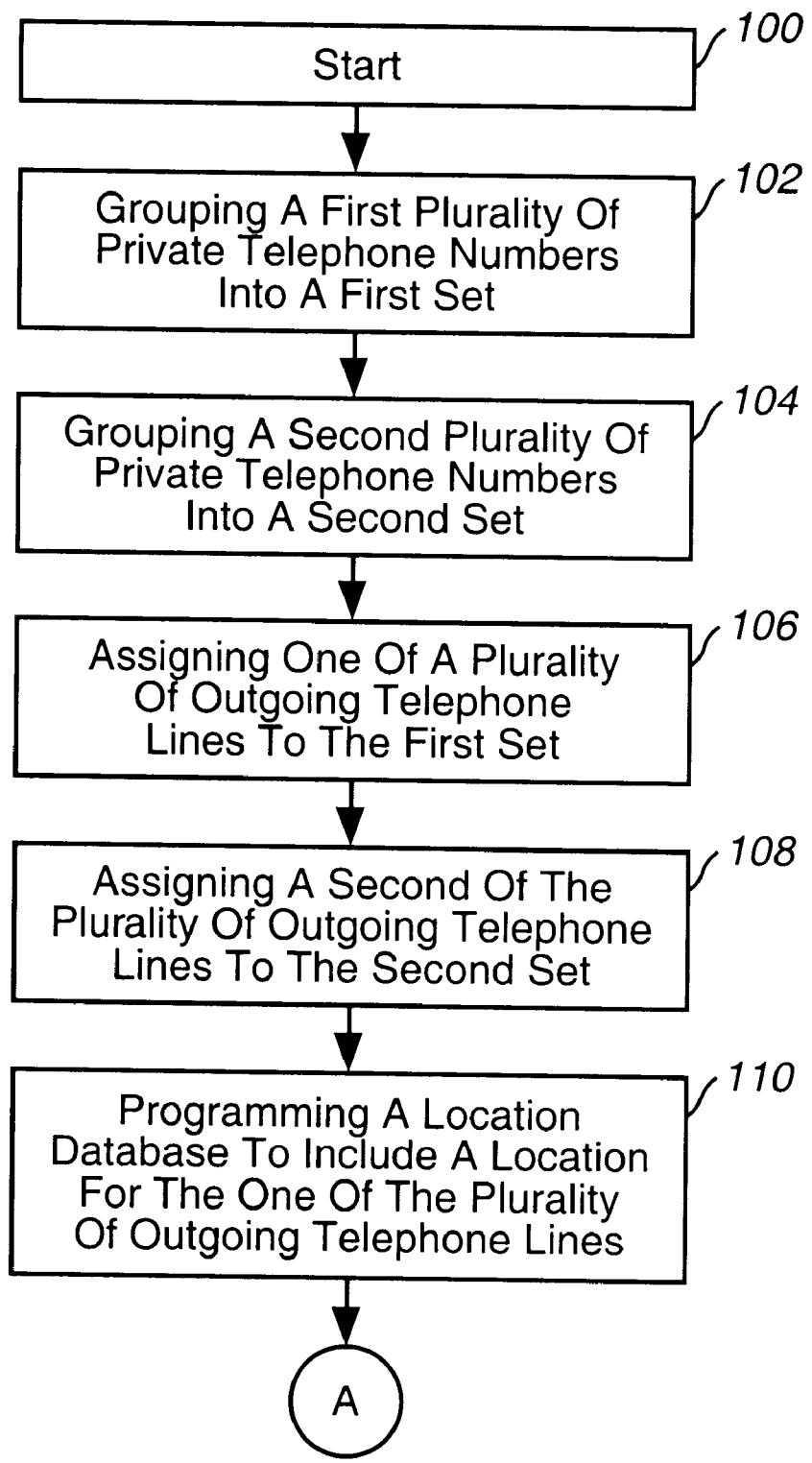
FIGS. 4 & 5 are a flow chart of the steps used in a method of providing 911 service to a private branch exchange in accordance with one embodiment of the invention.
Figure 5:
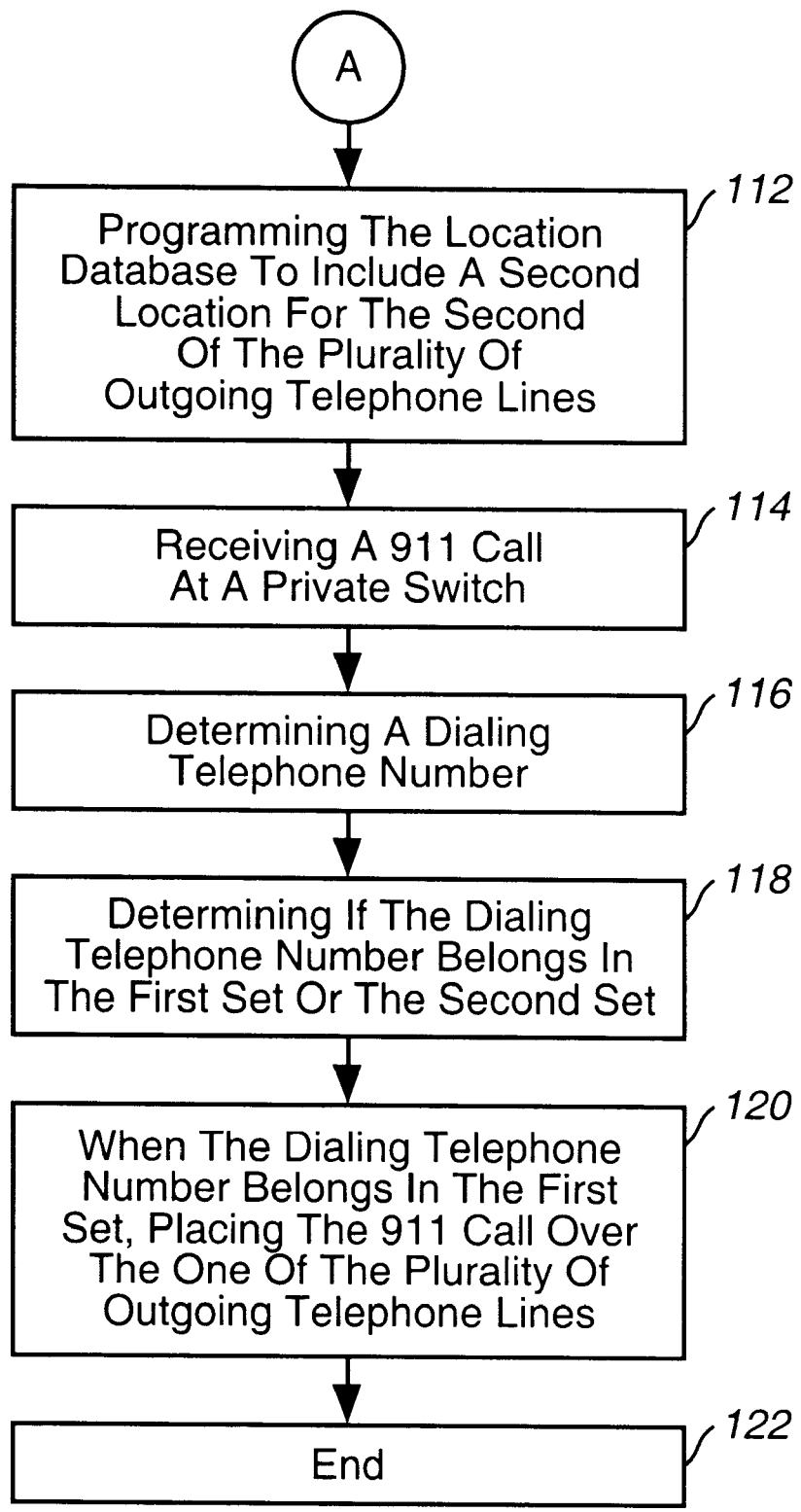

FIGS. 4 & 5 are a flow chart of the steps used in a method of providing 911 service to a private branch exchange in accordance with one embodiment of the invention. The process starts, step 100, by grouping a first plurality of private telephone numbers into a first set at step 102. A second plurality of private telephone numbers is grouped into a second set at step 104. One of a plurality of outgoing telephone lines is assigned to the first set at step 106. A second of the plurality of outgoing telephone lines is assigned to the second set at step 108. A location database is programmed to include a location for the one of the plurality of outgoing telephone lines at step 110. The location database is programmed to include a second location for the second of the plurality of outgoing telephone lines at step 112. A 911 call is received at a private switch at step 114. A dialing telephone number is determined at step 116. At step 118 it is determined if the dialing telephone number belongs in the first set or the second set. When the dialing telephone number belongs in the first set at step 120, the 911 call is place over the one of the plurality of outgoing telephone lines which ends the process at step 122. When the dialing telephone number belongs in the second set, the 911 call is place over the second of the plurality of outgoing telephone lines. The 911 call is received at a service switch point. The 911 call is triggered on and a query is sent to a switching control point. A response is received that includes a routing instruction. The 911 call is routed to a public safety answering point. A location query is sent to the location database. The call is forwarded to an operator. A location information is transmitted to the operator.

Thus there has been described a method of providing 911 service to a private telephone numbering system that is easy to setup.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of providing 911 service to a private branch exchange, comprising the steps of:
   a) assigning an outgoing telephone line for a 911 call to a set of private telephone numbers; and
   b) inputting a location information for the outgoing telephone line in a location database.

2. The method of claim 1, wherein step (a) further includes the step of:
   a1) selecting the set of private telephone numbers by an origination location.

3. The method of claim 1, further including the step of:
   c) when the 911 call is dialed from one of the set of private telephone numbers, sending the 911 call out over the outgoing telephone line.

4. The method of claim 3, further including the steps of:
   d) routing the 911 call to a public safety answering point;
   e) querying the location database for the location information associated with a telephone number of the outgoing telephone line.

5. A method of providing 911 service to a private branch exchange, comprising the steps of:
   a) receiving a 911 call at a private switch;
   b) determining a dialing telephone number; and
   c) looking up an associated outgoing telephone line.

6. The method of claim 5, further including the step of:
   d) placing the 911 call over the associated outgoing telephone line.

7. The method of claim 6, further including the steps of:
   e) routing the 911 call to a public safety answering point;
   f) sending a location query to a location database.

8. The method of claim 4, wherein step (a) further includes the steps of:
   a1) grouping a first plurality of private telephone numbers into a first set;
   a2) grouping a second plurality of private telephone numbers into a second set;
   a3) assigning one of a plurality of outgoing telephone lines to the first set;
   a4) assigning a second of the plurality of outgoing telephone lines to the second set.

9. A method of providing 911 service to a private branch exchange, comprising the steps of:
   a) grouping a first plurality of private telephone numbers into a first set;
   b) grouping a second plurality of private telephone numbers into a second set;
   c) assigning one of a plurality of outgoing telephone lines to the first set;
   d) assigning a second of the plurality of outgoing telephone lines to the second set;
   e) programming a location database to include a location for the one of the plurality of outgoing telephone lines;
   f) programming the location database to include a second location for the second of the plurality of outgoing telephone lines;
   g) receiving a 911 call at a private switch;
   h) determining a dialing telephone number;
   i) determining if the dialing telephone number belongs in the first set or the second set;
   j) when the dialing telephone number belongs in the first set, placing the 911 call over the one of the plurality of outgoing telephone lines
   k) receiving the 911 call at a service switching point;
   l) triggering on the 911 call and sending a query to a switching control point;
   m) receiving a response including a routing instruction;
   n) routing the 911 call to a public safety answering point;
   o) sending a location query to the location database
   p) forwarding the call to an operator; and
   q) transmitting a location information to the operator.

* * * * *